(12) United States Patent
Lim et al.

(10) Patent No.: US 9,048,669 B2
(45) Date of Patent: Jun. 2, 2015

(54) CHARGE EQUALIZATION APPARATUS AND METHOD FOR SERIES-CONNECTED BATTERY STRING

(75) Inventors: Jae Hwan Lim, Daejeon (KR); Sang Hyun Park, Daejeon (KR); Joong Hui Lee, Daejeon (KR); Gun-Woo Moon, Daejeon (KR); Hong-Sun Park, Daejeon (KR); Chol-Ho Kim, Daejeon (KR)

(73) Assignees: SK Innovation Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 975 days.

(21) Appl. No.: 13/146,881

(22) PCT Filed: Jan. 27, 2010

(86) PCT No.: PCT/KR2010/000479
§ 371 (c)(1),
(2), (4) Date: Dec. 20, 2011

(87) PCT Pub. No.: WO2010/087608
PCT Pub. Date: Aug. 5, 2010

(65) Prior Publication Data
US 2012/0086390 A1    Apr. 12, 2012

(30) Foreign Application Priority Data
Jan. 30, 2009  (KR) .................. 10-2009-0007544

(51) Int. Cl.
H02J 7/00 (2006.01)
(52) U.S. Cl.
CPC ............ H02J 7/0019 (2013.01); *Y02T 10/7055* (2013.01)

(58) Field of Classification Search
USPC ........................................................ 320/117
See application file for complete search history.

(56) References Cited

U.S. PATENT DOCUMENTS

| 6,583,602 B2* | 6/2003 | Imai et al. ..................... 320/118 |
| 2003/0146737 A1 | 8/2003 | Kadouchi et al. |
| 2006/0214636 A1 | 9/2006 | Arai et al. |
| 2010/0007308 A1* | 1/2010 | Lee et al. ...................... 320/118 |
| 2010/0225275 A1* | 9/2010 | Bucur et al. ................... 320/116 |

FOREIGN PATENT DOCUMENTS

| CN | 1938919 A | 3/2007 |
| JP | 1032936 A | 2/1998 |
| JP | 2001178008 A | 6/2001 |
| JP | 2004194410 A | 7/2004 |

(Continued)

*Primary Examiner* — Drew A Dunn
*Assistant Examiner* — Robert Grant
(74) *Attorney, Agent, or Firm* — The Webb Law Firm

(57) ABSTRACT

Provided are a charge equalization apparatus and method for a battery string connected in series, and more particularly, are a charge equalization apparatus and method that efficiently perform charge equalization while reducing entire complexity and volume and lowering production costs through a configuration that an individual battery included in a battery string shares a single voltage sensing module and a single charge equalizing module; a switch block of a two-stage structure forms a current path for measuring voltage of individual batteries included in the battery string, and at the same time, forms a charging or discharging path of a low-charged or over-charged battery among the battery strings; and a switch device having low withstand voltage is used.

15 Claims, 4 Drawing Sheets

(56) References Cited

FOREIGN PATENT DOCUMENTS

| | | |
|---|---|---|
| JP | 2005284297 A | 10/2005 |
| JP | 2006507790 A | 3/2006 |
| JP | 200848496 A | 2/2008 |
| JP | 2008196869 A | 8/2008 |
| JP | 2008220151 A | 9/2008 |
| KR | 20030096978 A | 12/2003 |
| KR | 1020060078967 A | 7/2006 |
| KR | 1020070064244 A | 6/2007 |
| KR | 100831160 B1 | 5/2008 |
| KR | 100839381 B1 | 6/2008 |
| KR | 100839382 B1 | 6/2008 |
| KR | 1020080080864 A | 9/2008 |
| WO | 2009013464 A1 | 1/2009 |

* cited by examiner

CHARGE EQUALIZATION APPARATUS AND METHOD FOR SERIES-CONNECTED BATTERY STRING

TECHNICAL FIELD

The present invention relates to a charge equalization apparatus and method for a series-connected battery string, and more particularly, to a charge equalization apparatus and method that efficiently perform charge equalization while reducing entire complexity and volume and lowering production costs through a configuration that an individual battery included in a battery string shares a single voltage sensing module and a single charge equalization module.

BACKGROUND ART

When a potential higher than a basic potential of unit battery (cell) is necessary, such as a hybrid vehicle using a lithium ion cell as a power source, it is common to use a plurality of unit batteries which are connected in series. However, even though the batteries are produced with the same structure via a typical production method using the same anode, cathode and electrolyte material, a difference in charging or discharging (and self discharging) characteristics exists between each of the batteries connected in series.

Therefore, a potential difference can exist between the unit batteries when using the batteries connected in series. Even if one battery of the unit batteries connected in series is perfectly discharged regardless of a potential of another battery, the battery is required to be recharged. Upon recharging the battery, since the potentials of the batteries are different from one another, there is a problem of over-charging in that the battery may reach a prescribed voltage in advance, as well as a problem of charge inefficiency in that some batteries may not reach the prescribed voltage even in an existence of an over-charging.

Further, when the number of charging/discharging times becomes large, degradation of materials included in the battery occurs to vary a property of the battery, and as a result, such degradation situation is responsible for further increasing a difference in individual cells.

In order to address such problems, there are proposed various charge-equalization apparatuses which can accomplish charge equalization of the batteries connected in series.

As an example, Korean Patent Publication No. 2008-0080864 is directed to a system that detects at least one first cell requiring cell balancing according to a plurality of cell voltages measured in a sensing unit for measuring each cell voltage of many cells, performs cell balancing on at least one first cell based on another method according to operation modes of a vehicle, and share a single cell balancing driving unit by a switch module in cell balancing. Korean Patent Publication No. 2006-0078967 is directed to a system for preventing an error by temperature and deterioration of a voltage detecting unit and detecting exact cell voltage, the system including: a plurality of battery cells; a plurality of cell relays connected to each of the cells; a voltage detecting unit including an amplifier; a sensing unit for measuring a temperature; and a microcontroller unit (MCU). The system is characterized in that the single voltage detecting unit is shared by individual cells through the cell relay.

Korean Patent Publication No. 2003-0096978 includes a plurality of unit cells, a charging means, a discharging means and a serial-to-parallel converting switch. The related art is directed to a system for performing charging by connecting the discharged unit cells in series by using the serial-to-parallel converting switch after equally discharging each unit cell. Korean Patent Publication No. 2007-0064244 is directed to a system, including a cell unit, a field effect transistor connected to the cell unit, an amplifying unit connected to the field effect transistor, a multiplexing unit for controlling an output signal of the amplifying unit, a comparing unit for comparing and determining variation of a voltage signal of the cell unit, an analog-to-digital (A/D) converting unit for converting the output of the comparing unit into a digital signal, a micro computer unit for receiving the signal output in the A/D converting unit and outputting a signal corresponding to charging/discharging conditions, a switching unit for supplying a battery balance current by operating according to signals of the micro computer unit, and a known charging/discharging circuit.

JP Patent Laid-Open No. 2008-196869 relates to a system having a feature that a capacitor is connected to each cell of an assembly cell including a plurality of cells in parallel, and the voltage of each capacitor is sequentially connected to a voltage detecting device by using one switching unit in a capacitor and the other switching unit in a ground. JP Patent Laid-Open No. 2005-0284297 relates to a system, including an assembly cell including a plurality of cells, a sampling switch for sampling voltage of each cell, a capacitor for detecting voltage of each cell, a transfer switch for transferring charge voltage charged to the capacitor, a ground potential setting switch for connecting a reference potential to a ground terminal of a voltage detecting device to sense voltage charged in the capacitor, and a voltage detection control means for controlling each switch and receiving voltage of the capacitor. JP Patent Laid-Open No. 1998-032936 is related to a system including a plurality of unit cells, a means for detecting remaining capacity of each unit cell, a charge and discharge replacing means for performing charging and discharging of each unit cell, a controller for individually controlling charging and discharging of each unit cell, and a direct current-to-direct current (DC/DC) converter performing charging and discharging of each unit cell independently. JP Patent Laid-Open No. 2004-194410 is related to a system including at least two unit cell groups, a means for detecting a difference between currents flowing each of a first cell group, and a second cell group, a means for controlling charging/discharging current of the cell group based on the current difference.

However, in the related charge equalizing apparatuses, since each of batteries connected in series is equipped with a charge equalizing apparatus or a voltage sensing apparatus to perform charging or discharging of individual batteries, there are limitations in that complexity and volume of the charge equalizing apparatus are increased thereby decreasing productivity and increasing production costs, and devices for controlling each component and forming a current route should withstand a high voltage stress.

DISCLOSURE OF INVENTION

Technical Problem

An object of the present invention is to provide a charge equalization apparatus and method for performing efficient charge equalization while reducing complexity and volume of the charge equalizing apparatus performing charge equalization for a battery string connected in series and to provide a charge equalization apparatus and method which can use devices having low withstanding voltage by reducing voltage stress of the elements used for controlling equalization and operation.

Solution to Problem

In one general aspect, an intelligently controllable charge equalization apparatus for a battery string connected in series, includes: a battery module having a plurality of batteries connected in series; a battery string having M (M≥2: M is a natural number) battery modules connected in series; a single voltage sensing module sensing voltage of each battery of the battery string; a single charge equalizing module that is connected to the voltage sensing module in parallel and charges or discharges each battery of the battery string; a bidirectional switch block that is included in each battery module and forms a parallel current path in each battery of the battery module; a module switch forming a current path between the bidirectional switch block and at least one of the voltage sensing module and charge equalizing module; and a microprocessor determining charge or discharge of the battery by receiving a voltage value measured in the voltage sensing module and controlling the bidirectional switch block and the module switch, wherein each battery of the battery string share the voltage sensing module and the charge equalizing module by the c and the module switch.

The bidirectional switch block of the battery module including batteries of k (k≥2: k is a natural number) may include 2 k bidirectional Metal Oxide Semiconductor Field Effect Transistor (MOSFET) switches, and on the basis of one battery of the battery module, the bidirectional MOSFET switches are respectively connected to both ends of cathode and anode of one battery to form the parallel current path.

As described above, since the bidirectional switch block according to the present invention is included according to each battery module, M bidirectional switch blocks are included in case of a battery string having M (M≥2: M is a natural number) battery modules connected in series. The bidirectional switch block of the battery module means one bidirectional switch block corresponding to one battery module, more particularly, one bidirectional switch block forming a parallel current path in each battery of one battery module.

The module switch may include M switch pairs and an 1 switch pair of the M switch pairs may include a 1-1 switch and a 1-2 switch connected to one bidirectional switch block, and on the basis of a bottom or top battery among the batteries of the battery module, one sides of the odd number$^{th}$ bidirectional MOSFET switches of the bidirectional switch block may be connected in parallel and be connected to the 1-1 switch; and one sides of the even number$^{th}$ bidirectional MOSFET switches may be connected in parallel and be connected to the 1-2 switch.

In case of a battery string having M (M≥2: M is a natural number) battery modules connected in series, the charge equalization apparatus according to the present invention may include M bidirectional switch blocks included according to each battery module, and a module switch including the M switch pairs. The switch pair of the module switch may connect one bidirectional switch block corresponding to one module according to each module with the single voltage sensing module and the charge equalizing module in parallel.

The M switch pairs may be respectively connected to the voltage sensing module in parallel.

To be specific, the bidirectional switch block may include a plurality of bidirectional MOSFET switches and Vgs applied when MOSFET of the bidirectional MOSFET switch is turned on is a potential of more than two batteries connected in series as a portion of the battery string. An electronic relay may be included in a gate of MOSFET of the bidirectional MOSFET switch.

The electronic relay may include a light-emitting diode and a light-receiving element and the light-emitting diode emits light by a control signal of the microprocessor for controlling the bidirectional switch block.

The voltage sensing module may include a capacitor, an analog-to-digital converter (AD converter), which has a potential of the capacitor as an input and provides an output value to the microprocessor, and a switch, which is included in an input end of the AD converter and is controlled by the microprocessor.

To be specific, the switch included in an input end of the AD converter is included between the input of the AD converter and the capacitor, and is controlled by the microprocessor such that the potential of the capacitor is inputted to the AD converter. The switch equipped in the input end of the AD converter is a high-speed relay.

The charge equalizing module may be a discharging circuit, a charging circuit or a charging/discharging circuit that comprises an active device selected from a group consisting of a Field Effect Transistor (FET), a Bipolar Junction Transistor (BJT), a relay and a diode; and a passive device selected from a group consisting of an inductor, a transformer and a capacitor.

The charge equalizing module may include a direct current-to-direct current (DC/DC) converter, and the DC/DC converter includes a charge type DC/DC converter, a discharge type DC/DC converter or a charge/discharge type DC/DC converter.

Preferably, a primary or secondary winding of the DC/DC converter may be connected to the entire potential of the battery string. In charging, the charge of the battery has an effect on the entire potential of the battery string. In discharging, the potential discharged from the battery has an effect on the entire potential of the battery string.

A switch controlling on/off operations of the DC/DC converter may be included in each end of the primary winding and the secondary winding of the DC/DC converter of the charge equalizing module. Charging or discharging of the battery is optionally performed by the single DC/DC converter by controlling the switch of each end of the primary winding and secondary winding.

The switch of the DC/DC converter may be controlled by Pulse Width Modulation (PWM) signal by the microprocessor.

In one general aspect, a charge equalization method using the charge equalization apparatus, includes: controlling a module switch and a bidirectional switch block by a microprocessor and measuring voltage of each battery included in a battery string by using a voltage sensing module; selecting a balancing battery as a low-charged or over-charged battery on the basis of an average value of the measured voltage of the battery in the microprocessor; connecting a charge equalizing module with the balancing battery by controlling the bidirectional switch block and the module switch by the microprocessor; and charging or discharging the balancing battery by operating the charge equalizing module in the microprocessor.

To be specific, the connecting a charge equalizing module with the balancing battery and the charging or discharging the balancing battery may include: forming a parallel current path in the balancing battery by controlling the bidirectional switch block; forming a current path between the formed parallel current path and the charge equalizing module by controlling the module switch; and charging or discharging the balancing battery by controlling, by the microprocessor, a switch included in each end of a primary winding and a secondary winding of a DC/DC converter that is equipped in the charge equalizing module and has entire voltage of the battery string as input or output.

Advantageous Effects of Invention

A charge equalization apparatus and method of the present invention efficiently reduce complexity and volume of the charge equalization apparatus and lower production costs through remarkable reduction of constituent elements for charge equalization by a feature that the entire battery is divided into modules; a bidirectional switch block forming a parallel current path in each battery included in one module according to each battery module; and each battery of the battery string shares a voltage sensing module and a charge equalizing module through a two-stage switch structure of including an individual battery module and a module switch forming a current path between a voltage sensing module and a charge equalizing module in a back end of the bidirectional switch block. A low-voltage switch device having a low withstand voltage may be used by remarkably reducing voltage stress of the switches included to form a current path through the two-stage structure of the bidirectional switch block and the module switch equipped according to each battery module. Since circuits are divided into each battery module, it is easy to realize the circuit and possible to efficiently cope with damages of the circuit and have high flexibility in design.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
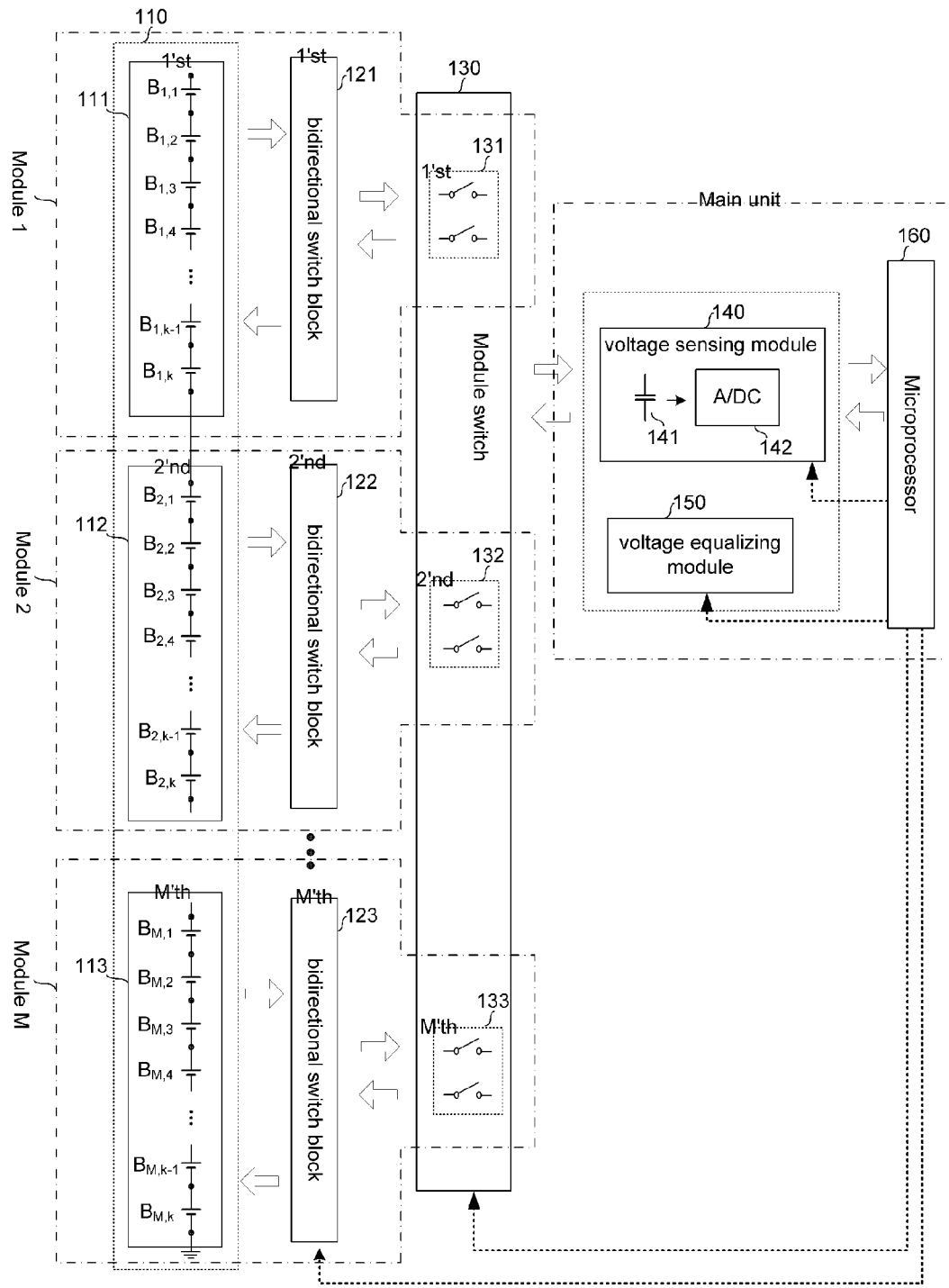
FIG. 1 is a diagram showing a charge equalization apparatus in accordance with an embodiment of the present invention.

110: battery string 111~116: battery module
121~126: bidirectional switch block
130: module switch
131~136: switch pair 140: voltage sensing module
150: charge equalizing module
160: microprocessor 141: capacitor
141': output voltage sensing module
142: AD converter 151: DC/DC converter

BEST MODE FOR CARRYING OUT THE INVENTION

Hereinafter, a charge equalization apparatus and method of the present invention will be described in detail with reference to the accompanying drawings, which is set forth hereinafter. The drawings introduced below are provided as examples for sufficiently transferring the concept of the present invention to those skilled in the art. Accordingly, the present invention is not limited to the drawings introduced below and may be specified into other formats. Also, the same reference numbers over the entire specification represent the same constituent elements.

Unless defined otherwise, all terms including technical and scientific terms used herein have the same meaning as commonly understood by one of ordinary skill in the art. A detailed description on the known function and configuration that may blur the point of the present invention is omitted in the following description and accompanying drawings.

FIG. 1 is a diagram showing an intelligently controllable charge equalization apparatus for a battery string connected in series according to the present invention. Battery strings 110 ($B_{1,1}$ to $B_{M,k}$) having a plurality of batteries connected in series are divided into a plurality of battery modules 111, 112 and 113 having more than two batteries connected in series. The battery string shown in FIG. 1 includes battery modules 111, 112 and 113 of M (M≥2) in total. FIG. 1 shows a case that the number of the series-connected batteries included in each of the battery module 111, 112 and 113 is k (k≥2). In FIG. 1, one battery included in the battery string is described by a mark of when one battery is included in a natural number$^{th}$ module of i (i≥1) and is located in a natural number$^{th}$ module of j (j≥1) on the basis of a top battery of an $i^{th}$ module. Although FIG. 1 shows a case that the numbers of batteries included in each of the battery module 111, 112 and 113 are the same as k ($B_{1,k}$, $B_{2,k}$, $B_{M,k}$), the numbers of batteries included in each module according to battery modules may be different.

Each of the battery modules 111, 112 and 113 includes bidirectional switch blocks 121, 122 and 123 according to each battery module. The bidirectional switch block 121 forms a parallel current path in each battery ($B_{1,1}$ to $B_{1,k}$) included in the battery module 111. A module switch 130 included in back ends of the bidirectional switch blocks 121, 122 and 123 optionally provides a current path to the corresponding bidirectional switch blocks 121, 122 and 123 of the battery modules 111, 112 and 113, respectively. One battery included in the battery string 110, e.g., $B_{2,2}$, is connected to a single voltage sensing module 140 and a single charge equalizing module 150 by the bidirectional switch block and the module switch.

The single voltage sensing module 140 measures voltage of the battery having a current path formed by the bidirectional switch blocks 121, 122 and 123 and the module switch 130 and provides the measurement value to a microprocessor 160. The single charge equalizing module 150 charges or discharges the battery having the current path formed by the bidirectional switch blocks 121, 122 and 123 and the module switch 130. It is preferred that the voltage sensing module 140 and the charge equalizing module 150 are connected in parallel.

As described above, all batteries included in the battery string 110 share the single voltage sensing module 140 and the single charge equalizing module 150. A current path is optionally formed between one battery included in the battery string 110 and at least one of the single voltage sensing module 140 and the single charge equalizing module 150 by the bidirectional switch block and the module switch.

The voltage sensing module 140 preferably includes a capacitor and the charge equalizing module 150 may be a discharging circuit, a charging circuit or a charging/discharging circuit that comprises an active device selected from a group consisting of a Field Effect Transistor (FET), a Bipolar Junction Transistor (BJT), a relay and a diode; and a passive device selected from a group consisting of an inductor, a transformer and a capacitor, or a direct current-to-direct current (DC/DC) converter, or may be a discharging circuit, a charging circuit or a charging/discharging circuit that comprises a DC/DC converter, preferably a DC/DC converter having a switch for controlling operation of the DC/DC converter in each end of a primary winding and a secondary winding.

The bidirectional switch blocks 121, 122 and 123 and the module switch 130 forms a charging or discharging path of a low-charged or over-charged battery in the battery string 110 while forming a current path for measuring voltage of each battery included in the battery string 110.

Accordingly, the batteries included in the battery string 110 share the single voltage sensing module 140 and the single charge equalizing module 150. The voltage sensing module 140 and the charge equalizing module 150 share the bidirectional switch blocks 121, 122 and 123, and the module switch 130.

A dotted line arrow of FIG. 1 shows a control signal. The microprocessor 160 receives a voltage value measured in the voltage sensing module 140, determines charging or discharging of the battery, and controls the bidirectional switch blocks 121, 122 and 123 and the module switch 130.

To be specific, the microprocessor 160 receives voltage measured in the voltage sensing module 140, calculates average voltage of the battery string 110, determines a balancing battery as a battery to be charged or discharged based on the average voltage of the battery string 110, and controls the bidirectional switch block and the module switch 130 to form a current path between the balancing battery and the charge equalizing module 150. To be specific, the microprocessor 160 forms a parallel current path in the balancing battery by controlling the corresponding bidirectional switch block of the battery module including the balancing battery, and forms a current path between the charge equalizing module 150 and the bidirectional switch block of the battery module including the balancing battery by controlling the module switch 130.

The microprocessor 160 sequentially receives voltage of the batteries included in the battery string 110 by controlling the bidirectional switch blocks 121, 122 and 123 and the module switch 130, calculates average voltage of the battery string 110, and determines more than one balancing battery based on the average voltage of the battery string 110. The microprocessor 160 calculates a list of an over-charged balancing battery to be discharged, a list of a low-charged balancing battery to be charged, or a balancing list to be charged and a balancing list to be discharged, and sequentially measures voltages of the batteries included in the battery string 110. Subsequently, the microprocessor 160 controls the bidirectional switch blocks 121, 122 and 123 and the module switch 130 according to the list of the balancing battery and performs charging or discharging more than once, i.e., the number of batteries included in the list of the balancing battery, by using the charge equalizing module 150.

In addition, as shown in FIG. 1, the microprocessor 160 controls on/off operations of the charge equalizing module 150 and controls a sensing operation of the voltage sensing module 140. It is preferred that the voltage sensing module 140 includes a capacitor 141 and an analog-to-digital converter (AD converter) 142. The voltage sensing module 140 measures voltage of individual battery included in the battery string 110 by the capacitor 141 and provides the voltage of individual batteries converted into a digital value by using the AD converter 142 for converting the voltage of the capacitor 141 as an analog value into a digital value to the microprocessor 160.

Figure 2:
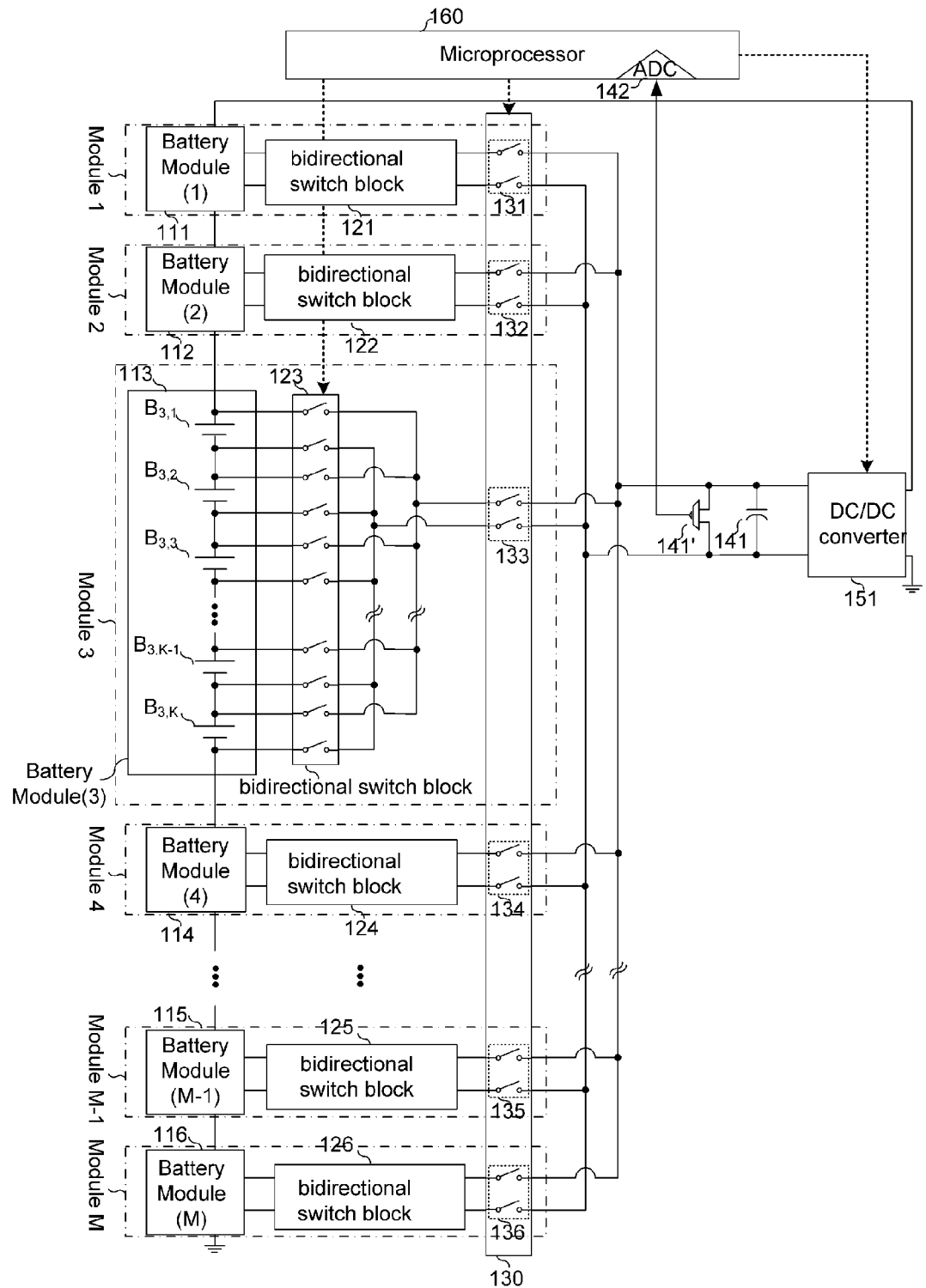
FIG. 2 is a diagram showing the charge equalization apparatus in accordance with another embodiment of the present invention.

A main unit of FIG. 1 includes the voltage sensing module 140, the charge equalizing module 150 and the microprocessor 160. Preferably, as shown in FIG. 2, the voltage sensing module includes the capacitor 141 and the AD converter 142, and the charge equalizing module 150 includes a DC/DC converter 151 performing charging or discharging, or charging and discharging of the battery.

There is a feature that a primary winding or a secondary winding of the DC/DC converter 151 is connected to the entire voltage of the battery string 110.

The parallel connection of the voltage sensing module 140 and the charge equalizing module 150 described based on FIG. 1 preferably has a structure that one winding, which is not connected to the entire voltage of the battery string 110 among the primary and secondary windings of the DC/DC converter 151, is connected to the capacitor 141 included in the voltage sensing module 140 in parallel.

As shown in FIG. 1, the module switch 130 includes a plurality of switch pairs 131, 132 and 133 as a pair of switches. For example, one switch pair 132 controls whether a current path is formed between the bidirectional switch block 122 of the battery module 112 and at least one of the voltage sensing module 140 and the charge equalizing module 150. Accordingly, when the battery string 110 is divided into M battery modules, the module switch 130 includes M switch pairs 131, 132 and 133 and each of the switch pairs 131, 132 and 133 provides a current path to the corresponding bidirectional switch block of the battery modules.

As described above, the module switch 130 forms a current path of each battery module and the bidirectional switch block forms a parallel current path in individual batteries included in the battery module. As shown in FIG. 1, the $M^{th}$ battery module 113 is connected to the $M^{th}$ bidirectional switch block 123 and the $M^{th}$ bidirectional switch block is connected to the $M^{th}$ switch pair 133 of the module switch to form a structure that a plurality of modules, i.e., a module 1, a module 2, and a module M of FIG. 1, including the bidirectional switch block and the switch pair are included.

Accordingly, although the number of batteries included in the battery string 110 varies, it is easy to change and extend a device by adding or removing of the module 1, the module 2, and the module M. Also, since circuits are divided according to each battery module, it is easy to realize a circuit and efficiently cope with circuit damage caused by deterioration of the device, and it is possible to have high flexibility in design.

Each of M switch pairs 131, 132, and 133 included in the module switch 130 is preferably connected to the voltage sensing module 140 in parallel to share the single voltage sensing module 140 and the single charge equalizing module 150 in individual batteries included in the battery string.

To be specific, as shown in FIG. 2, the M switch pairs 131 to 136 included in the module switch 130 are preferably connected to the capacitor 141 included in the voltage sensing module 140 in parallel.

As shown in FIG. 1 or 2, the bidirectional switch block of the battery module including k (k≥2: k is a natural number) batteries includes 2 k bidirectional Metal Oxide Semiconductor Field Effect Transistor (MOSFET) switches. On the basis of one battery included in the battery module, the bidirectional MOSFET switch is connected to each end of an anode and a cathode to form the parallel current path.

With reference to FIG. 2, connection of the module switch 130 and the bidirectional switch block will be described. One battery module is connected to one bidirectional switch block and one bidirectional switch block is connected to one switch pair included in the module switch 130. Preferably, on the basis of a bottom or top battery among the batteries included in the battery module, one sides of the odd number$^{th}$ bidirectional MOSFET switches included in the bidirectional switch block are connected in parallel and are connected to one switch of the switch pairs and one sides of the even number$^{th}$ bidirectional MOSFET switches are connected in parallel and are connected to the other switch of the same switch pairs.

To be specific, in the bidirectional MOSFET switch included in the bidirectional switch block, one side is connected to a node between closely series-connected batteries and the other side is connected to one switch of the switch pairs. Bidirectional MOSFET switches, which are included in the same bidirectional switch block but are not neighboring, are connected to one another in parallel and are connected to one switch of the switch pairs or another switch. The switch pair is a bidirectional MOSFET switch, a unidirectional MOSFET switch or a relay.

Figure 3:
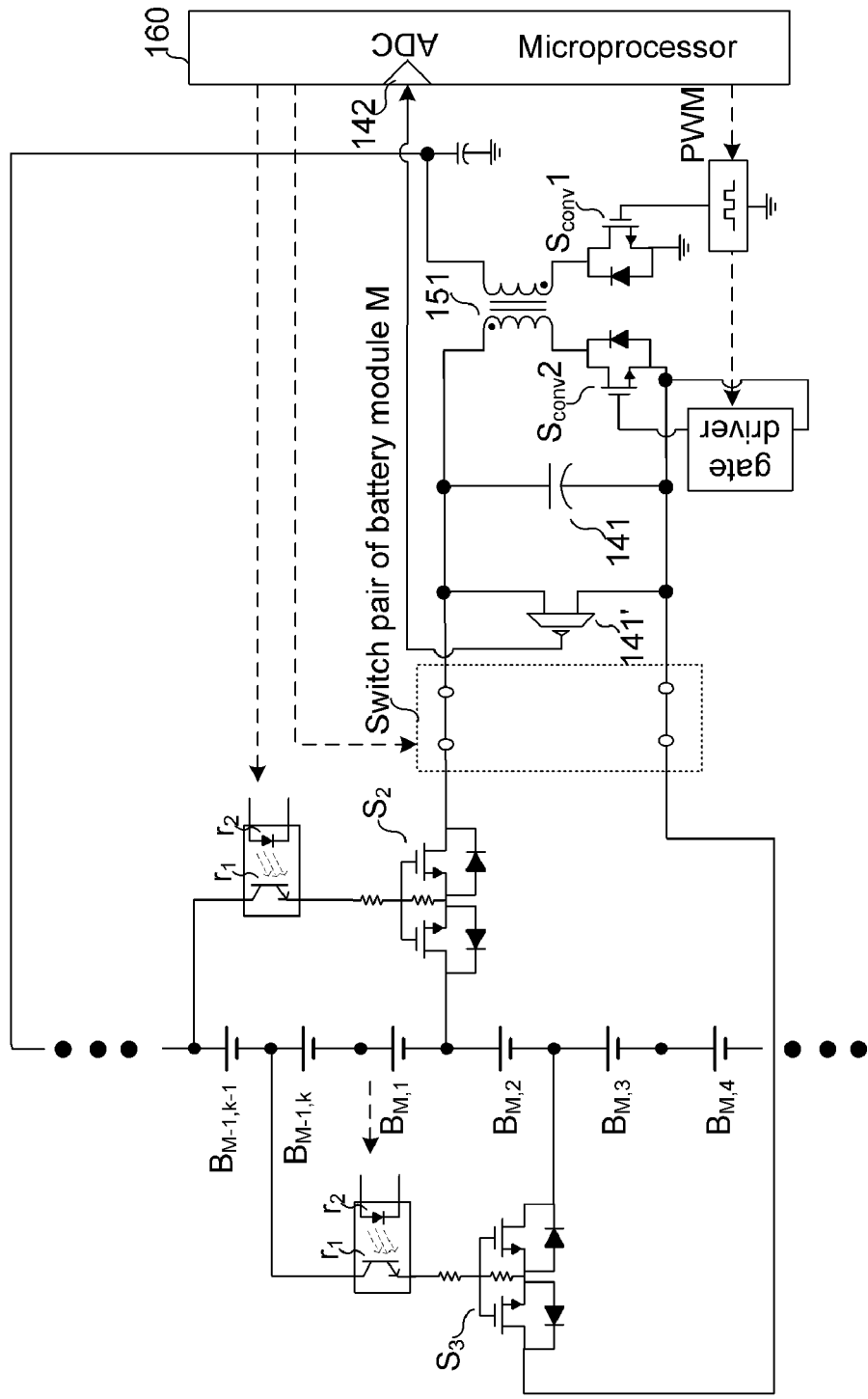
FIG. 3 is a diagram showing a current path of a $K^{th}$ battery of an $M^{th}$ battery module of the charge equalization apparatus in accordance with an embodiment of the present invention.

As shown in FIGS. 2 to 3, the AD converter 142 may be formed integrally with a microprocessor and the voltage sensing module 140 is configured to further include an output voltage sensing module 141' with the capacitor 141. The output voltage sensing module 141' reads voltage of each battery measured in the capacitor 141 without load effect and provides the result for input of the AD converter 142.

FIG. 3 is a diagram showing an example of voltage measurement or charge equalization of a $2^{nd}$ battery of the $M^{th}$ battery module. For the sake of convenience in recognition, FIG. 3 does not show the entire bidirectional MOSFET switch and module switch equipped in each end of the battery included in the battery module, but shows only the bidirectional MOSFET switch and the switch pair that are controlled to form a current path of a $2^{nd}$ battery ($B_{M,2}$) of the $M^{th}$ battery module, i.e., that are controlled in a low impedance state.

As shown in FIG. 3, the bidirectional MOSFET switches ($S_2$, $S_3$) are preferably a low-voltage bidirectional MOSFET switch and performs operations by receiving ON/OFF signals of the microprocessor 160. Accordingly, it is preferred that the bidirectional MOSFET switches ($S_2$, $S_3$) are connected to a relay capable of generating ON/OFF signals in input of the bidirectional MOSFET switches ($S_2$, $S_3$), i.e., a gate of MOSFET, preferably to an electronic relay.

The electronic relay is a Solid State Relay or an Optocoupler, and preferably comprises a light-emitting diode (r2) and a light-receiving element (r1) as shown in FIG. 3. The light-receiving element (r1) is preferably BJT. BJT (r1) receives the light of the light-emitting diode to be in a low impedance state (a turn-on state). Accordingly, a potential of at least two batteries connected in series, which are one portion of the battery string, is applied to a gate of the MOSFET included in the bidirectional MOSFET switch.

To be specific, as shown by the dotted line arrow of FIG. 3, the light-emitting diode (r2) emits light by a control signal of the microprocessor 160 for controlling the bidirectional switch block. BJT (r1) is turned on by light-emitting of the light-emitting diode (r2) and turn-on voltage is applied to the gate of MOSFET included in the bidirectional MOSFET switch. As shown in FIG. 3, Vgs for turning on MOSFET included in the bidirectional MOSFET switch, where Vgs is gate voltage on the basis of source voltage of MOSFET, is a potential of more than two batteries connected in series as a portion of the battery string. In FIG. 3, a potential of series-connected 3 batteries is Vgs applied when MOSFET is turned on.

As described above, partial voltage of the battery module is used as a power source for driving each bidirectional MOSFET switch included in the bidirectional switch block. As shown in FIG. 3, the bidirectional MOSFET switch included in the bidirectional switch block uses a portion of the battery string voltage as a power supply device and has a feature of performing highly reliable ON and OFF switch operations by equipping an electronic relay in the gate.

The charge equalizing module 150 includes the DC/DC converter 151 that has the entire voltage of the battery string 110 as an input and whose output is connected to the capacitor 141. It is preferred to include switches ($S_{conv}1$ and $S_{conv}2$) in each end of the primary and secondary windings of the DC/DC converter 151.

The intelligently controllable charge equalization apparatus of the present invention may further include a control chip for only Pulse width modulation (PWM) that generates a PWM signal. It is preferred that the switches ($S_{conv}1$, $S_{conv}2$) are controlled by receiving a PWM signal generated in the microprocessor 160 or the control chip for only PWM (not shown) as a portion in charge of on/off operations of each the DC/DC converter 151. When the PWM signal generated in the microprocessor 160 is used, there is a limitation in driving of a power switch since a current quantity of the PWM signal generated in the microprocessor is limited. Accordingly, it is preferred to further include an additional circuit.

Preferably, the switches ($S_{conv}1$, $S_{conv}2$) equipped in the DC/DC converter 151 include a diode for providing a MOSFET device and a current path, i.e., an opposite direction with respect to a MOSFET turn-on current, in a state that the MOSFET device is turned off, i.e., high impedance.

Discharging or charging of over-charged or low-charged balancing battery will be described with reference to FIG. 3. As shown in FIG. 3, when the microprocessor 160 forms a parallel current path in the balancing battery ($B_{M,2}$ of FIG. 3) by turning on the bidirectional MOSFET switches ($S_2$, $S_3$), and turns on the switch pair of the battery module including the balancing battery by controlling the module switch, a current path between the balancing battery ($B_{M,2}$) and the DC/DC converter 151 is formed.

When the balancing battery is low-charged after formation of the current path by the microprocessor, the switch ($S_{conv}1$) of the DC/DC converter 151 is turned on and a current is induced in the primary winding of the transformer of the DC/DC converter 151 due to voltage of the entire battery string. As a result, a magnetic energy of same amount is stored in the transformer. Subsequently, when the switch $S_{conv}1$ of the DC/DC converter 151 is turned off, the magnetic energy stored in the transformer moves to the balancing battery through the secondary winding and a diode of the switch ($S_{conv}2$).

Reversely, when over-charged balancing battery is required to be discharged, the secondary winding switch ($S_{conv}2$) instead of the primary winding switch ($S_{conv}1$) of the DC/DC converter 151 is turned on, and the energy stored in the secondary winding of the transformer moves to the primary winding. As a result, the over-charged energy of the balancing battery is supplied to the entire battery string and forms an energy discharge circuit which has an effect on the potential of the battery string.

The DC/DC converter 151 is operated by operations of the switches ($S_{conv}1$, $S_{conv}2$) having a fixed duty ratio such that two switches ($S_{conv}1$, $S_{conv}2$) cannot be simultaneously turned on. The DC/DC converter of the equalizing module 150 may be a flyback type DC/DC converter as shown in FIG. 3 and DC/DC converters of other types may be used.

Figure 4:
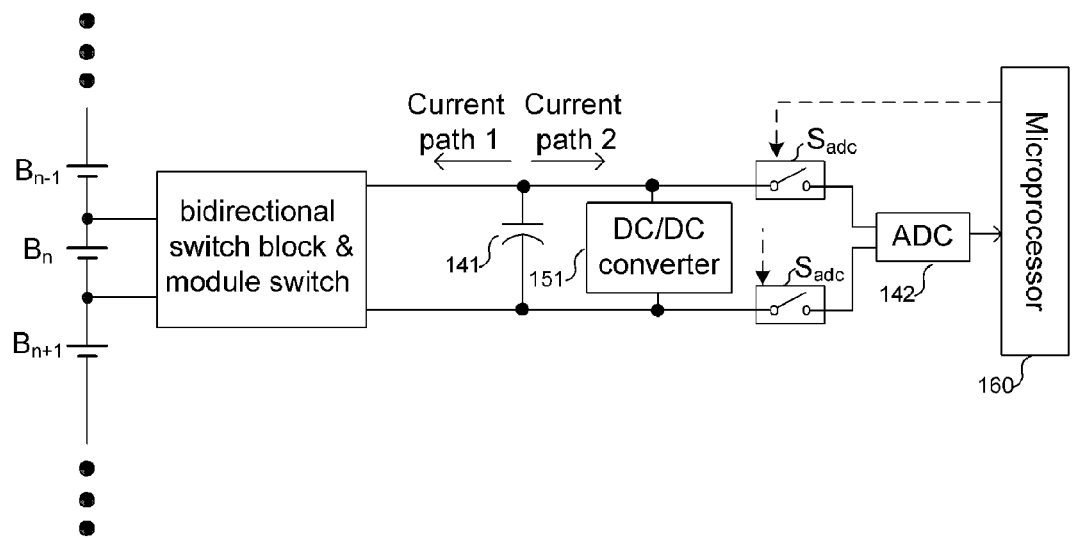
FIG. 4 is a diagram showing the charge equalization apparatus in accordance with still another embodiment of the present invention.

FIG. 4 shows an example of measuring voltage of each battery of the battery string 110. The voltage sensing module 140 includes the capacitor 141, the AD converter 142 for having the potential of the capacitor 141 as an input and providing an output value to the microprocessor 160, and a switch sensing switch ($S_{adc}$) that is included in an input end of the AD converter 142 and controlled by the microprocessor 160. The sensing switch ($S_{adc}$) is preferably a high-speed relay.

As shown in FIG. 4 as current paths 1 and 2, on the basis of the capacitor 141 of the voltage sensing module 140, voltage information of the corresponding battery is acquired by using a method for sampling voltage to the capacitor 141, which is located between the switch of the battery, i.e., the bidirectional switch block and the module switch, and the switch of the AD converter 142, i.e., the sensing switch ($S_{adc}$), by alternatively using the bidirectional switch block and the module switch, i.e., the switch pair, forming a current path with one battery ($B_n$ of FIG. 4) whose voltage is to be measured, and the sensing switch ($S_{adc}$) for forming a current path between the capacitor 141 and the AD converter. The operation of the battery voltage sensing is sequentially performed from the top battery or the bottom battery of the battery string.

Preferably, the microprocessor 160 measures voltage of the batteries included in the battery string sequentially by controlling the sensing switch ($S_{adc}$), the bidirectional switch block, which includes the electronic relay or Optocoupler of the gate for controlling impedance of a switch device, and the module switch, calculates average battery string voltage based on the measured battery voltage, calculates a balancing battery list based on the calculation result, and charges or discharges the balancing battery by controlling the bidirectional switch block, which includes the electronic relay or Optocoupler of the gate for controlling impedance of a switch device, the module switch, and the switches ($S_{conv}1$, $S_{conv}2$) included in the DC/DC converter.

The operation of the DC/DC converter for voltage sensing and charge equalization of the battery using the capacitor is performed through time division.

The charge equalization method using the above-mentioned charge equalization apparatus according to the present invention will be described. A microprocessor, a modules witch, a bidirectional switch block, a voltage sensing module, a charge equalizing module, a DC/DC converter of the charge equalizing module, a switch of the DC/DC converter, a balancing battery, voltage sensing of the battery, and charging or discharging of the balancing battery used in charge equalization method according to the present invention are similar to those described in the charge equalization apparatus according to the present invention.

The charge equalization method according to the present invention includes a) controlling a module switch and a bidirectional switch block by a microprocessor and measuring voltage of each battery included in a battery string by using a voltage sensing module; b) selecting a balancing battery as a low-charged or over-charged battery on the basis of an average value of the measured voltage of the battery in the microprocessor; c) connecting a charge equalizing module with the balancing battery by controlling the bidirectional switch block and the module switch by the microprocessor; and d) charging or discharging the balancing battery by operating the charge equalizing module in the microprocessor.

To be specific, the operations c) and d) include c1) forming a parallel current path in the balancing battery by controlling the bidirectional switch block; c2) forming a current path between the formed parallel current path and the charge equalizing module by controlling the module switch; and d1) charging or discharging the balancing battery by controlling, by the microprocessor, a switch included in each end of a primary winding and a secondary winding of a DC/DC converter that is equipped in the charge equalizing module and has entire voltage of the battery string as input or output.

The balancing battery of the operation b) may be more than one over-charged battery or more than one low-charged battery. When the number of the balancing batteries is plural, the operations c) and d) are repeated according to each balancing battery.

After the operation d), the operation a) for measuring the voltage of each battery included in a battery string may be repeated.

It is preferred that the operations c) and d) of the charge equalization method according to the present invention are performed when each battery potential of the battery string is different in a state that an electric charge device or electric load is not connected to a battery string connected in series. However, although the electric charge device or the electric load is connected to the battery string connected in series, the operations c) and d) may be performed when a size of a current quantity is so large or when a size of a charged current or a discharged current is so small that a winding of the DC/DC converter connected to the entire battery voltage and a switch of the DC/DC converter functions as a bypass circuit.

After the operation a), the operations b), c) and d) may be performed when potentials of each battery included in the battery string are different. It is determined by performing a pre-programmed algorithm based on a value of the battery voltage input in the operation a) whether the operations b), c) and d) will be performed.

To be specific, in the operation a), sensings on voltage of the batteries included in the battery string are sequentially performed. Values of the voltage where sensings are sequentially performed according to the sequence of the batteries are input and stored in the microprocessor. Subsequently, on the basis of average voltage of the battery string, batteries having voltage larger than a reference voltage value are determined as a balancing battery to be discharged and batteries having voltage smaller than the reference voltage value are determined as a balancing battery to be charged to form a balancing battery list. The batteries to be charged or discharged are determined by the balancing battery list and charging or discharging of the balancing battery are sequentially performed.

As described based on the device of FIG. 4, a method for sampling voltage to the capacitor 141, which is located between the switch of the battery, i.e., the bidirectional switch block and the module switch, and the switch of the AD converter, i.e., the sensing switch ($S_{adc}$), is used in voltage sensing of each battery included in the battery string of the operation a) by controlling the current path by the bidirectional switch block and the module switch, and the current path by the sensing switch included between inputs of the AD converter to be alternately formed by the microprocessor.

As described based on FIG. 3, in charging or discharging of the balancing battery or the balancing battery list generated in the operation b), a current path between a balancing battery and a DC/DC converter is formed by turning on the switch pair of the battery module including the balancing battery by controlling, by the microprocessor, the module switch after forming a parallel current path in the balancing battery by controlling the bidirectional switch block in the operation c).

After forming the current path in the microprocessor in the operation c), charging or discharging of the balancing battery is performed by controlling, by the microprocessor, the switches of each end of the primary and secondary windings of the DC/DC converter.

The switch of the DC/DC converter stores potential of the battery string or potential of the balancing battery connected to the primary winding or the secondary winding as magnetic energy, and moves the energy to the balancing battery or the battery string connected to the secondary winding or the primary winding. Accordingly, there is a feature that charging or discharging of the battery by the single DC/DC converter is optionally performed. The charge energy of the charged balancing battery is supplied to the entire battery string and has an effect on the potential of the battery string. The discharge energy of the discharged balancing battery is supplied to the entire battery string and has an effect on the potential of the battery string.

While the present invention has been described with respect to specific matters, certain preferred embodiments and drawings, it will be apparent that the present invention is not limited to the above embodiments and various changes and modifications may be made from the description by those skilled in the art.

Thus, the idea of the invention should not be construed to be restricted to the Examples, but any equivalency or equivalent modifications of claims, as well as claims themselves described here-in-below are intended to fall under the scope of the idea of the invention.

The invention claimed is:

1. An intelligently controllable charge equalization apparatus for a battery string connected in series, comprising:
   a battery module having a plurality of batteries connected in series;
   a battery string having M battery modules connected in series, wherein M is a natural number of 2 or more;
   a single voltage sensing module sensing voltage of each battery of the battery string;
   a single charge equalizing module that is connected to the voltage sensing module in parallel and charges or discharges each battery of the battery string;
   a bidirectional switch block that is included in each battery module and forms a parallel current path in each battery of the battery module;
   a module switch forming a current path between the bidirectional switch block and at least one of the voltage sensing module and the charge equalizing module; and
   a microprocessor determining charge or discharge of the battery by receiving a voltage value measured in the voltage sensing module and controlling the bidirectional switch block and the module switch,
   wherein each battery of the battery string shares the voltage sensing module and the charge equalizing module by the bidirectional switch block and the module switch; and
   wherein the bidirectional switch block of the battery module that includes k batteries includes 2 k bidirectional Metal Oxide Semiconductor Field Effect Transistor (MOSFET) switches, wherein k is a natural number of 2 or more, and on the basis of one battery of the battery module, the bidirectional MOSFET switches are respectively connected to both ends of a cathode and an anode of one battery to form the parallel current path.

2. The charge equalization apparatus of claim 1, wherein the module switch includes M switch pairs and an 1 switch pair of the M switch pairs includes a 1-1 switch and a 1-2 switch connected to one bidirectional switch block, and
   on the basis of a bottom or top battery among the batteries of the battery module, one sides of the odd numbered bidirectional MOSFET switches of the bidirectional switch block are connected in parallel and are connected to the 1-1 switch; and
   one sides of the even numbered bidirectional MOSFET switches are connected in parallel and are connected to the 1-2 switch.

3. The charge equalization apparatus of claim 2, wherein the M switch pairs are respectively connected to the voltage sensing module in parallel.

4. The charge equalization apparatus of claim 1, wherein the bidirectional switch block includes a plurality of bidirectional MOSFET switches and Vgs, which is a gate voltage on the basis of a source voltage of a MOSFET applied when the MOSFET of the bidirectional MOSFET switch is turned on is a potential of more than two batteries connected in series as a portion of the battery string.

5. The charge equalization apparatus of claim 4, wherein an electronic relay is included in a gate of MOSFET of the bidirectional MOSFET switch.

6. The charge equalization apparatus of claim 5, wherein the electronic relay includes a light emitting diode and a light-receiving element and the light-emitting diode emits light by a control signal of the microprocessor for controlling the bidirectional switch block.

7. The charge equalization apparatus of claim 1, wherein the voltage sensing module includes a capacitor, an analog-to-digital converter (AD converter), which has a potential of the capacitor as an input and provides an output value to the microprocessor, and a switch, which is included in an input end of the AD converter and is controlled by the microprocessor.

8. The charge equalization apparatus of claim 1, wherein the charge equalizing module is a discharging circuit, a charging circuit or a charging/discharging circuit that comprises an active device selected from a group consisting of a Field Effect Transistor (FET), a Bipolar Junction Transistor (BJT), a relay and a diode; and a passive device selected from a group consisting of an inductor, a transformer and a capacitor.

9. The charge equalization apparatus of claim 1, wherein the charge equalizing module includes a direct current-to-direct current (DC/DC) converter, and the DC/DC converter includes a charge type DC/DC converter, a discharge type DC/DC converter or a charge/discharge type DC/DC converter.

10. The charge equalization apparatus of claim 9, wherein a primary or secondary winding of the DC/DC converter is connected to the entire potential of the battery string.

11. The charge equalization apparatus of claim 10, wherein a switch controlling on/off operations of the DC/DC converter is included in each end of the primary winding and the secondary winding of the DC/DC converter.

12. The charge equalization apparatus of claim 11, wherein the switch of the DC/DC converter is controlled by a Pulse Width Modulation (PWM) signal by the microprocessor.

13. The charge equalization apparatus of claim 11, wherein the intelligently controllable charge equalization apparatus further includes a control chip for only PWM generating a PWM signal, and the switch of the DC/DC converter is controlled by the PWM signal of the control chip for only PWM.

14. A charge equalization method using the charge equalization apparatus defined claim 1, comprising:
   controlling a module switch and a bidirectional switch block in a microprocessor and measuring voltage of each battery included in a battery string by using a voltage sensing module;
   selecting a balancing battery as a low-charged or over-charged battery on the basis of an average value of the measured voltage of the battery in the microprocessor;

connecting a charge equalizing module with the balancing battery by controlling the bidirectional switch block and the module switch in the microprocessor; and charging or discharging the balancing battery by operating the charge equalizing module in the microprocessor.

15. The charge equalization method of claim 14, wherein the connecting a charge equalizing module with the balancing battery and the charging or discharging the balancing battery comprises:

forming a parallel current path in the balancing battery by controlling the bidirectional switch block;

forming a current path between the formed parallel current path and the charge equalizing module by controlling the module switch; and charging or discharging the balancing battery by controlling, by the microprocessor, a switch included in each end of a primary winding and a secondary winding of a DC/DC converter that is equipped in the charge equalizing module and has entire voltage of the battery string as input or output.

* * * * *